US008717224B2

(12) United States Patent
Jeong

(10) Patent No.: US 8,717,224 B2
(45) Date of Patent: May 6, 2014

(54) INTEGRATED RADAR APPARATUS AND INTERGRATED ANTENNA APPARATUS

(75) Inventor: Seong Hee Jeong, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 463 days.

(21) Appl. No.: 12/984,397

(22) Filed: Jan. 4, 2011

(65) Prior Publication Data
US 2011/0163909 A1 Jul. 7, 2011

(30) Foreign Application Priority Data
Jan. 6, 2010 (KR) .................. 10-2010-0000717

(51) Int. Cl.
*G01S 13/93* (2006.01)
*G01S 7/292* (2006.01)
*H01Q 3/24* (2006.01)

(52) U.S. Cl.
USPC ................................ 342/70; 342/93; 343/876

(58) Field of Classification Search
USPC ............................................. 342/70–72, 876
See application file for complete search history.

(56) References Cited

U.S. PATENT DOCUMENTS

| | | | |
|---|---|---|---|
| 6,750,810 B2 * | 6/2004 | Shinoda et al. | 342/149 |
| 6,853,329 B2 * | 2/2005 | Shinoda et al. | 342/149 |
| 7,148,840 B2 * | 12/2006 | Dooi et al. | 342/131 |
| 7,289,058 B2 * | 10/2007 | Shima | 342/70 |
| 7,420,525 B2 * | 9/2008 | Colburn et al. | 343/911 L |
| 7,573,420 B2 * | 8/2009 | Forstner et al. | 342/175 |
| 7,692,575 B2 * | 4/2010 | Nishimura | 342/147 |
| 7,817,081 B2 * | 10/2010 | Inoue et al. | 342/70 |
| 8,405,541 B2 * | 3/2013 | Lee et al. | 342/118 |
| 2004/0207552 A1 * | 10/2004 | Isaji | 342/70 |
| 2006/0012511 A1 * | 1/2006 | Dooi et al. | 342/70 |
| 2008/0001809 A1 * | 1/2008 | Woodington et al. | 342/70 |
| 2008/0136702 A1 * | 6/2008 | Tsuchihashi et al. | 342/27 |
| 2008/0258964 A1 * | 10/2008 | Schoeberl et al. | 342/189 |
| 2008/0278370 A1 * | 11/2008 | Lachner et al. | 342/200 |
| 2008/0291088 A1 * | 11/2008 | Nagai | 342/374 |
| 2009/0201194 A1 * | 8/2009 | Winkler et al. | 342/146 |
| 2009/0251357 A1 * | 10/2009 | Margomenos | 342/70 |
| 2010/0295721 A1 * | 11/2010 | Focke et al. | 342/70 |
| 2011/0074621 A1 * | 3/2011 | Wintermantel | 342/70 |

* cited by examiner

*Primary Examiner* — Matthew M Barker
(74) *Attorney, Agent, or Firm* — McDermott Will & Emery LLP

(57) ABSTRACT

An embodiment of the present invention discloses a radar apparatus and an antenna apparatus, and more particularly, an integrated radar apparatus and an integrated antenna apparatus which make it possible to attain angle resolution with high definition, to decrease size and the number of devices, to integrate long and mid-range radar function and short range radar function.

14 Claims, 12 Drawing Sheets

INTEGRATED RADAR APPARATUS AND INTERGRATED ANTENNA APPARATUS

CROSS-REFERENCE TO RELATED APPLICATION

This application claims priority from and the benefit under 35 U.S.C. §19(a) of Korean Patent Application No. 10-2010-0000717, filed on Jan. 6, 2010, which is hereby incorporated by reference for all purposes as if fully set forth herein.

BACKGROUND OF THE INVENTION

1. Field of the Invention

The present invention relates to a radar apparatus and an antenna apparatus, and more particularly to an integrated radar apparatus and an integrated antenna apparatus, which make it possible to achieve an angle resolution with high definition, to reduce a size of the radar and the number of devices included therein, and to integrate long and mid-range radar function and short range radar function.

2. Description of the Prior Art

As the intellectualization of the vehicle proceeds, a conventional vehicle is being equipped with various kinds of vehicle systems, such as: an ACC (Adaptive Cruise Control) system for detecting a driver's own lane; an LCA (Lane-Change Assist) system for performing the detection of a side-rear lane; a STOP & GO system for performing a front detection and anti-crash function; a Parking Assist system for performing a parking control; LCA (Lane-Change Assist)/BSD (Blind-Spot Detection)/RPC (Rear Pre Crash) system for detecting a side-rear and another vehicle cutting in from a side lane to thereby perform the crash warning and the anti-crash.

However, various kinds of vehicle systems for the vehicle require different distances to targets, and thus signal transmission ranges of radars used in the vehicle systems are different from each other. For instance, the ACC system adopts long range radar for ACC system in order to detect the driver's own lane within a range between 0 and 250 m. The STOP & GO system adopts short range radar for STOP & GO system in order to detect the vehicle cutting in from a side lane within a range between 0 and 60 m, so that it performs the functions of the crash warning and the anti-crash. Also, in the LCA/BSD system, the short range radar mounted at the side-rear performs the BSD function within a range between 0 and 20 m, i.e., the detection of the blind spot nearby, and the mid-range radar for LCA performs the detection of the side-rear lane within a range between 0 and 70 m.

However, in order to apply the ACC system, LCA system, STOP & GO system, LCA/BSD/RPC system to the vehicle, the short range radar apparatus and the long and mid range radar apparatus should be separately mounted to the vehicle, because it is necessary to meet different distances to the targets required by vehicle systems and different ranges of the radar signals.

However, to separately mount the short range radar apparatus for the short range vehicle system and the long and mid-range radar apparatus for the long and mid-range vehicle system has many limitations in a mounting space for covering both the short range radar apparatus and the long and mid-range radar apparatus, due to an ultrasonic sensor, a license plate, a fog lamp, support structures and etc., which are already contained in a bumper of the vehicle.

On one hand, the vehicle systems applied to the vehicle need to recognize the situation around the vehicle in order to secure the intellectualized and stabilized driving and parking and the driver's safety, and thus the angle resolution with the high definition (referred to as "Lateral Resolution") is required. Conventionally, in order to obtain the angle resolution with the high definition, more array antennas were included in a receiving antenna. In other words, a number of channels for the receiving antenna were included in order to thereby improve the angle resolution. However, the conventional way of improving the angle resolution has the disadvantage in that the size of the radar apparatus as well as the size of the antenna increases. Also, the increase in the number of the antennas and channels increase the number of devices for transmitting/receiving a signal in the radar apparatus.

On the other hand, although the short range radar apparatus for the short range vehicle system and the long and mid-range radar apparatus for the long and mid range vehicle system are integrated into a single apparatus to thereby embody an integrated radar apparatus, the integrated apparatus still has the problems in that as the number of the antennas and the channels increase, the size of the radar apparatus and the number of the devices included in the radar apparatus increase, and the manufacturing cost increases accordingly, because it is necessary to meet different distances to the targets desired by vehicle systems, the different ranges of the radar signals, and the angle resolution with the high definition (the lateral resolution).

Accordingly, it is needed to provide an integrated radar apparatus with an antenna structure, which makes it possible to attain the angle resolution with the high definition, to decrease the size and the number of the devices and to integrate the long and mid-range radar function and the short radar function, but such an integrated radar apparatus has not yet developed.

SUMMARY OF THE INVENTION

Accordingly, the present invention has been made to solve the above-mentioned problems occurring in the prior art, and an object of the present invention is to provide an antenna structure, which makes it possible to attain the angle resolution with the high definition, to decrease the size of the radar and the number of devices, and to intellectualize the long and min range radar function and the short range radar function, and an integrated radar apparatus, which makes it possible to efficiently perform the signal transmission/reception for the long and mid range radar function and the short range radar function using the above antenna structure.

In order to accomplish this object, there is provided an integrated radar apparatus including: an antenna unit having a long and mid-range antenna unit and a short range antenna unit, wherein the long and mid-range antenna unit includes a plurality of long and mid-range transmitting antennas and a plurality of long and mid-range receiving antennas and the short range antenna unit includes one or more short range transmitting antennas and one or more short range receiving antennas; a transceiver unit for controlling the long and mid-range antenna unit and the short range antenna unit according to one or more ways of controlling the antenna selected from a way of switching and a way of multi-channel, transmitting one or more of the long and mid-range signals and the short range signals, and receiving one or more of the long and mid-range echo signals generated by reflecting the long and mid-range signals on long and mid-range targets and short range echo signals generated by reflecting the short range signals on short range targets.

In accordance with another aspect of the present invention, there is provided an integrated antenna apparatus including: a plurality of long and mid-range transmitting antennas, a plurality of long and mid-range receiving antennas, one or more short range transmitting antennas and one or more short range receiving antennas, wherein a distance between the plurality of long and mid-range transmitting antennas is proportional to the product of a distance between the plurality of the long and mid-range receiving antennas by the number of the plurality of the long and mid-range receiving antennas.

In accordance with another aspect of the present invention, there is provided an integrated antenna apparatus including: a plurality of long and mid-range transmitting antennas, a plurality of long and mid-range receiving antennas, one or more short range transmitting antennas and one or more short range receiving antennas, wherein the one or more short range transmitting antennas and the one or more short range receiving antennas are arranged between the plurality of the long and mid-range transmitting antennas.

As described above, the embodiment of the present invention provides the antenna structure, which makes it possible to attain the angle resolution with the high definition, to decrease the size and the number of devices, and to integrate the long and mid-range radar function and the short range radar function, and the integrated radar apparatus for efficiently performing the signal transmission and the signal reception for the long and mid-range radar function and the short range radar function using the antenna structure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
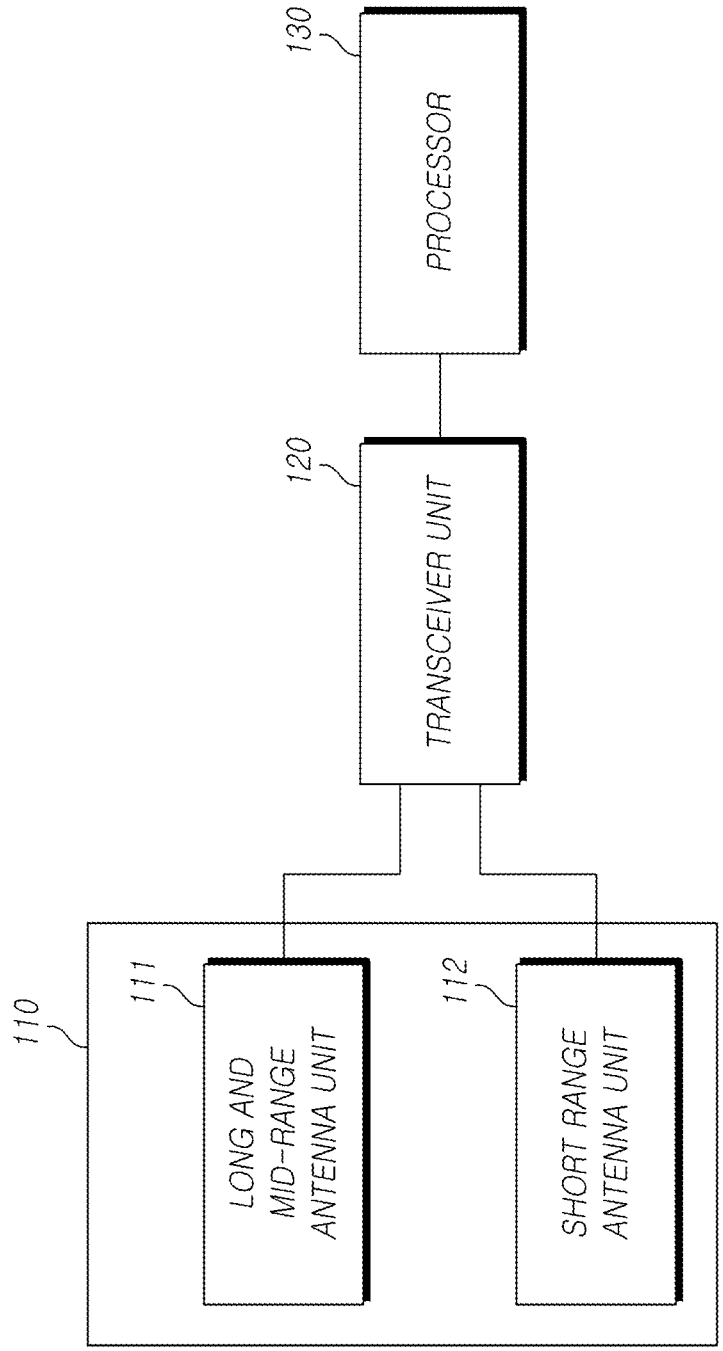
FIG. 1 is a schematic block diagram of an integrated radar apparatus in accordance with an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a schematic block diagram of an integrated radar apparatus 100 in accordance with the embodiment of the present invention.

Referring to FIG. 1, the integrated radar apparatus 100 in accordance with the embodiment of the present invention includes: an antenna unit 110 which has a long and mid-range antenna unit 111 including a plurality of long and mid-range transmitting antennas and a plurality of long and mid-range receiving antennas, and a short range antenna unit 112 including one or more short range transmitting antennas and one or more short range receiving antennas; and a transceiver unit 120 which controls the long and mid-range antenna unit 111 and the short range antenna unit 112 according to one or more ways of controlling the antenna selected from a way of switching and a way of multi-channel, transmits one or more signals of long and mid-range signals and short range signals, and receives one or more echo signals of long and mid-range echo signals generated by reflecting the long and mid-range signals on long and mid-range targets and short range echo signals generated by reflecting the short range signals on short range targets. The integrated radar apparatus 100 is also called an integrated radar sensor.

Figure 2:
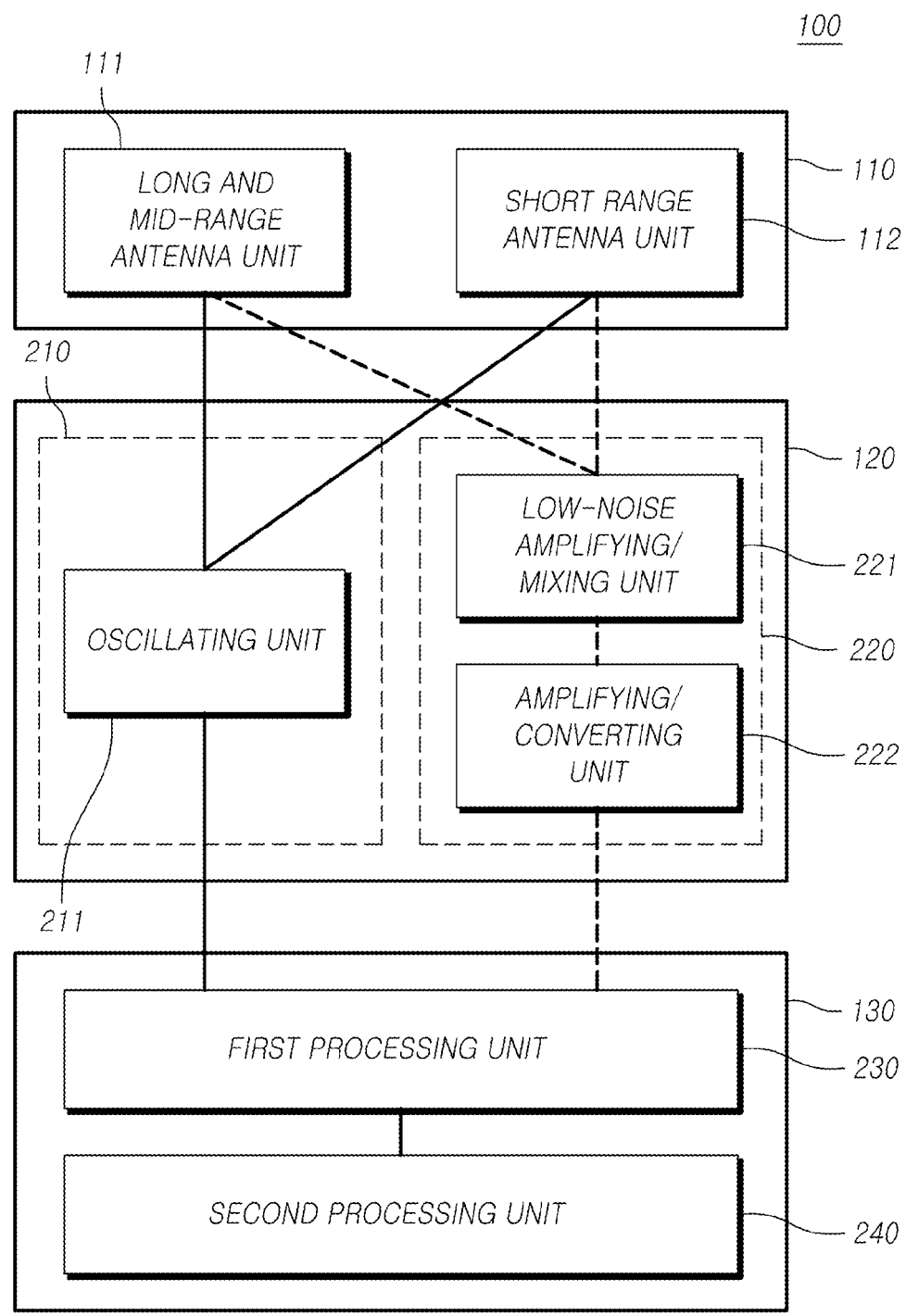
FIG. 2 is a detailed block diagram of an integrated radar apparatus in accordance with an embodiment of the present invention.

FIG. 2 illustrates the more detailed block diagram with respect to the block diagram of the integrated radar apparatus 100 in accordance with the embodiment of the present invention schematically illustrated in FIG. 1.

Referring to FIG. 2, the transceiver unit 120 includes: a transmitting unit 210 for transmitting the long and mid-range signals through the long and mid-range antenna unit 111 and transmitting the short range signals through the short range antenna unit 112; and a receiving unit 220 for receiving through the long and mid-range antenna unit 111 the long and mid-range echo signals generated by reflecting the transmitted long and mid-range signals on the targets and receiving through the short range antenna unit 112 the short range echo signals generated by reflecting the transmitted short range signals on the targets.

Referring to FIG. 2, the transmitting unit 210 included in the transceiver unit 120 includes an oscillating unit 211 for one or more of the long and mid-range signals and the short range signals.

Referring to FIG. 2, the receiving unit 220 included in the transceiver unit 120 includes: a low-noise amplifying/mixing unit 221 for low-noise amplifying one or more of the long and mid-range echo signals and the short range echo signals and mixing one or more of the long and mid-range echo signals and the short range echo signals which are amplified with the low noise; and an amplifying/converting unit 222 for amplifying one or more of the long and mid-range echo signals and the short range echo signals, which are mixed, and digital-converting one or more of the long and mid-range echo signals and the short range echo signals, which are amplified, to thereby generate one or more of the long and mid-range receiving data and short range receiving data.

As described herein above, the transceiver unit 120 performs the signal transmission and reception by controlling the long and mid-range antenna unit 111 and the short range antenna unit 112 according to one or more ways of controlling antenna selected from the way of switching and the way of multi-channel.

If the transceiver unit 120 controls the plurality of long and mid-range transmitting antennas included in the long and mid antenna unit 111 and the one or more short range transmitting antennas included in the short range antenna unit 112 according to the way of controlling the antenna, such as the way of switching, it is switched to an antenna selected from the plurality of long and mid-range transmitting antennas and the one or more short transmitting antennas to thereby transmit the long and mid-range signals or the short range signals through the selected long and mid-range transmitting antenna or the selected short range transmitting antenna.

If the transceiver unit 120 controls the plurality of long and mid-range transmitting antennas included in the long and mid antenna unit 111 and the one or more short range transmitting antennas included in the short range antenna unit 112 according to the way of controlling the antenna, such as the way of multi-channel, it transmits the long and mid-range signal and the short range signal through individual channels, each of which is assigned to the plurality of long and mid-range transmitting antennas and the one or more short range transmitting antennas.

If the transceiver unit 120 controls the plurality of long and mid-range receiving antennas included in the long and mid antenna unit 111 and the one or more short range receiving antennas included in the short range antenna unit 112 according to the way of controlling the antenna, such as the way of switching, it is switched to an antenna selected from the plurality of long and mid-range receiving antennas and the one or more short receiving antennas to thereby receive the long and mid-range echo signals or the short range echo signals through the selected long and mid-range receiving antenna or the selected short range receiving antenna.

If the transceiver unit 120 controls the plurality of long and mid-range receiving antennas included in the long and mid range antenna unit 111 and the one or more short range receiving antennas included in the short range antenna unit 112 according to the way of controlling the antenna, such as the way of multi-channel, it receives the long and mid-range echo signal and the short range echo signal through individual channels, each of which is assigned to the plurality of long and mid-range receiving antennas and the one or more short range receiving antennas.

The number of the channels needed in the transceiver unit 120 may be varied depending on the way of controlling the antenna adopted in the transceiver unit 120. For instance, if the transceiver unit 120 controls the long and mid-range antenna unit 111 and the short range antenna unit 112 according to the way of controlling the antenna, such as the way of switching, only a single channel is used in the oscillating unit 211 and the low-noise amplifying/mixing unit 221 included in the transceiver unit 120. Otherwise, if the transceiver unit 120 controls the long and mid-range antenna unit 111 and the short range antenna unit 112 according to the way of controlling the antenna, such as the way of multi-channel, the oscillating unit 211 and the low-noise amplifying/mixing unit 221 included in the transceiver unit 120 use the channels, the number of which corresponds to the number of the antennas including the plurality of long and mid-range transmitting antennas and the one or more short range transmitting antennas.

The above description may be summarized as follows. In order to transmit one or more of the long and mid-range signals and the short range signals, the transmitting unit 210 may control the plurality of long and mid-range transmitting antennas and the one or more short range transmitting antenna(s) according to the way of switching or the way of multi-channel. Also, in order to receive one or more of the long and mid-range echo signal and the short range echo signal, the receiving unit 220 may control the plurality of long and mid-range receiving antennas and the one or more short range receiving antennas according to the way of switching or the way of multi-channel. The embodiment of the integrated radar apparatus 100 according to the way of controlling the antenna in the transceiver unit 120 will be exemplarily described herein below with respect to FIGS. 5-8.

In the embodiment illustrated in FIG. 5-8, however, it is necessary to include, as the transmitting channel, three channels for two long and mid-range transmitting antennas (Tx1, Tx2) and one short range transmitting antenna (tx1) and, as the receiving channel, six channels for four long and mid-range receiving antennas (Rx1, Rx2, Rx3, Rx4) and two short range receiving antennas (rx1, rx2).

Figure 5:
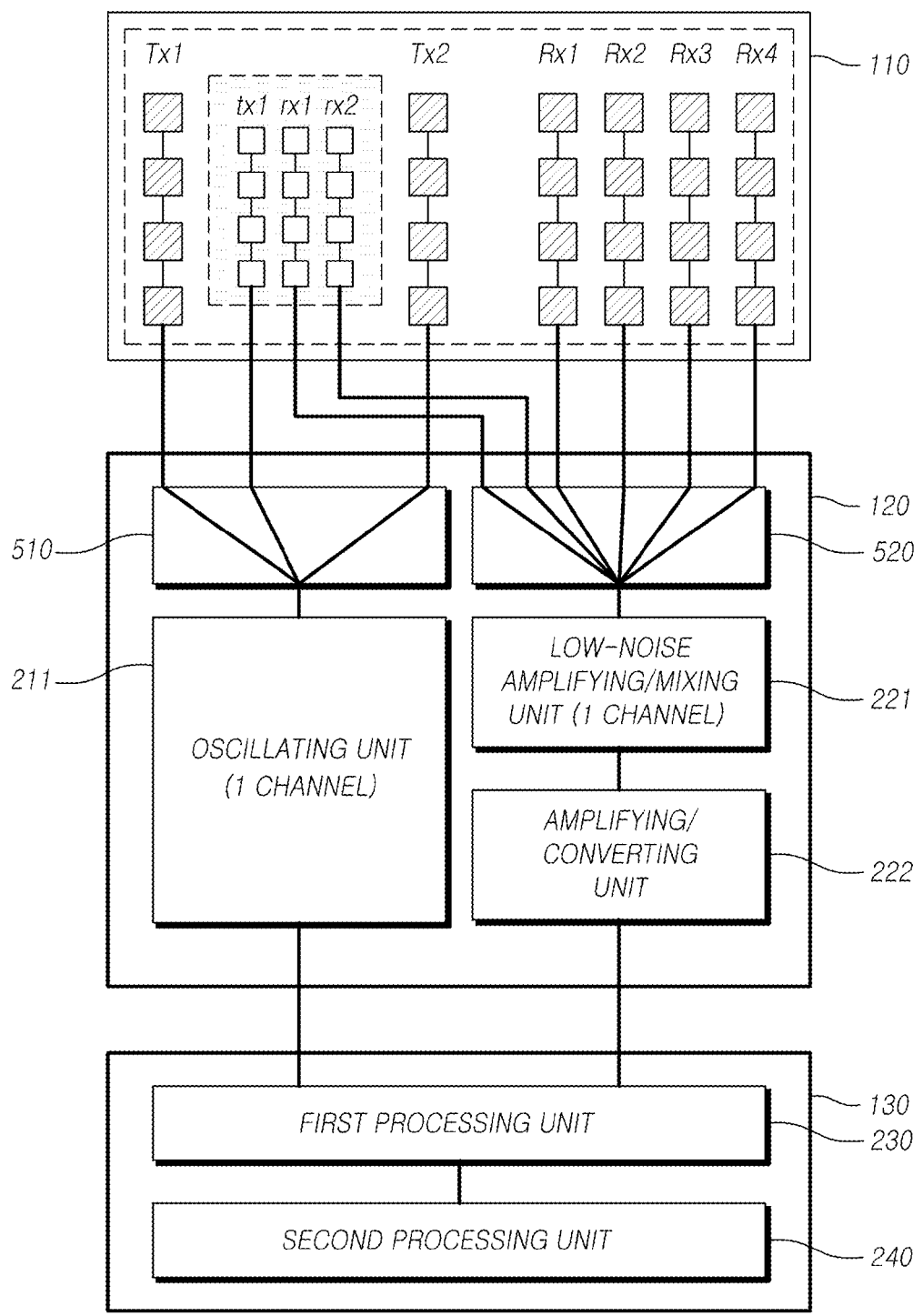
FIG. 5 is an exemplary view of illustrating a way of controlling the antenna included in an integrated radar apparatus in accordance with an embodiment of the present invention.

As illustrated in FIG. 5, if both the transmitting unit 210 and the receiving unit 220 included in the transceiver unit 120 controls the transmitting antenna and the receiving antennas according to the way of controlling the antenna, such as the way of switching, the integrated radar apparatus may be embodied as illustrated in FIG. 5 by including a transmitting terminal switch 510 at the transmitting unit 210 and a receiving terminal switch 520 at the receiving unit 220 in the transceiver unit 120.

Here, because the transmitting unit 210 switches to an antenna of the plurality of long and mid-range transmitting antennas (Tx1, Tx2) and the one or more short range transmitting antennas (tx1) through the transmitting terminal switch 510, and then transmits the long and mid-range signal or the short range signal through the selected one of the transmitting antennas (Tx1, Tx2, tx1), the oscillating unit 211 in the transmitting unit 210 only needs to generate the long and mid-range signals or the short range signals to be transmitted through the selected one of the transmitting antennas (Tx1, Tx2, tx1). Accordingly, the oscillating unit 211 needs only a single channel.

Also, because the receiving unit 220 switches to an antenna of the plurality of long and mid-range receiving antennas (Rx1, Rx2, Rx3, Rx4) and the one or more short range receiving antennas (rx1, rx2) through the receiving terminal switch 520, and then receives the long and mid-range range echo signal or the short range echo signal through the selected one of the receiving antennas (Rx1, Rx2, Rx3, Rx4, rx1, rx2), the low noise amplifying/mixing unit 221 included in receiving unit 220 only needs to perform the functions of low-noise amplifying and mixing for the long and mid-range echo signals or the short range echo signals, which are received through the selected one of the receiving antennas (Rx1, Rx2, Rx3, Rx4, rx1, rx2). Accordingly, the low-noise amplifying/mixing unit 221 needs only a single channel.

With reference to the integrated radar apparatus in FIG. 5, the transmission of the long and mid-range signal and the short range signal, and the reception of the long and mid-range echo signal and the short range echo signal will be detailed herein again. Referring to FIG. 5, the oscillating unit 211, which may include a voltage oscillator and an oscillator module, generates the long and mid-range signals and the short range signals, each of which is a modified signal in a waveform. Then, the generated long and mid-range signal is transmitted through the first selected long and mid-range transmitting antenna (Tx1) of the long and mid-range antennas (Tx1, Tx2). Thereafter, the long and mid-range echo signal generated by reflecting the transmitted long and mid-range signals on the long and mid-range targets is received through the selected receiving antenna, while each of four long and mid-range receiving antennas (Rx1, Rx2, Rx3, Rx4) are sequentially selected per a channel with a time delay there-between.

As described herein before, if the period for receiving the long and mid-range data and processing signal is finished, wherein the long and mid-range data receiving antennas (Rx1, Rx2, Rx3, Rx4) receive the long and mid-range echo signal generated by the long and mid-range signal transmitted through the first long and mid-range antenna (Tx1), switching to the second long and mid-range transmitting antenna (Tx2) is performed to thereby transmit the long and mid-range signal and then long and mid-range echo signals are received by switching to the long and mid-range receiving antenna (Rx1, Rx2, Rx3, Rx4). With all these processes, all of the periods for receiving the long and mid-range data and processing the signal are completed.

Afterward, the transmitting terminal switch 510 switches to the short range transmitting antenna (tx1) to thereby transmit the short range signal by way of beam radiation, and the receiving terminal switch 520 at the receiving terminal switches to each of the short range receiving antennas (rx1, rx2) to thereby receive the short range echo signal through the individual channels.

According to the embodiment of the integrated radar apparatus in FIG. 5, it is possible to provide the angle resolution with the high definition, to reduce the total number of the antennas, and thus to reduce the number of the RF hardware devices, by integrating the long and mid-range radar function and the short range radar function. Also, with the arrangement of the short range transmitting antenna and the short range receiving antenna between the long and mid-range transmitting antennas (Tx1, Tx2), it is possible to embody the small-sized integrated radar apparatus 100 enabling the long and mid-range detection and the short range detection at the same time.

Figure 6:
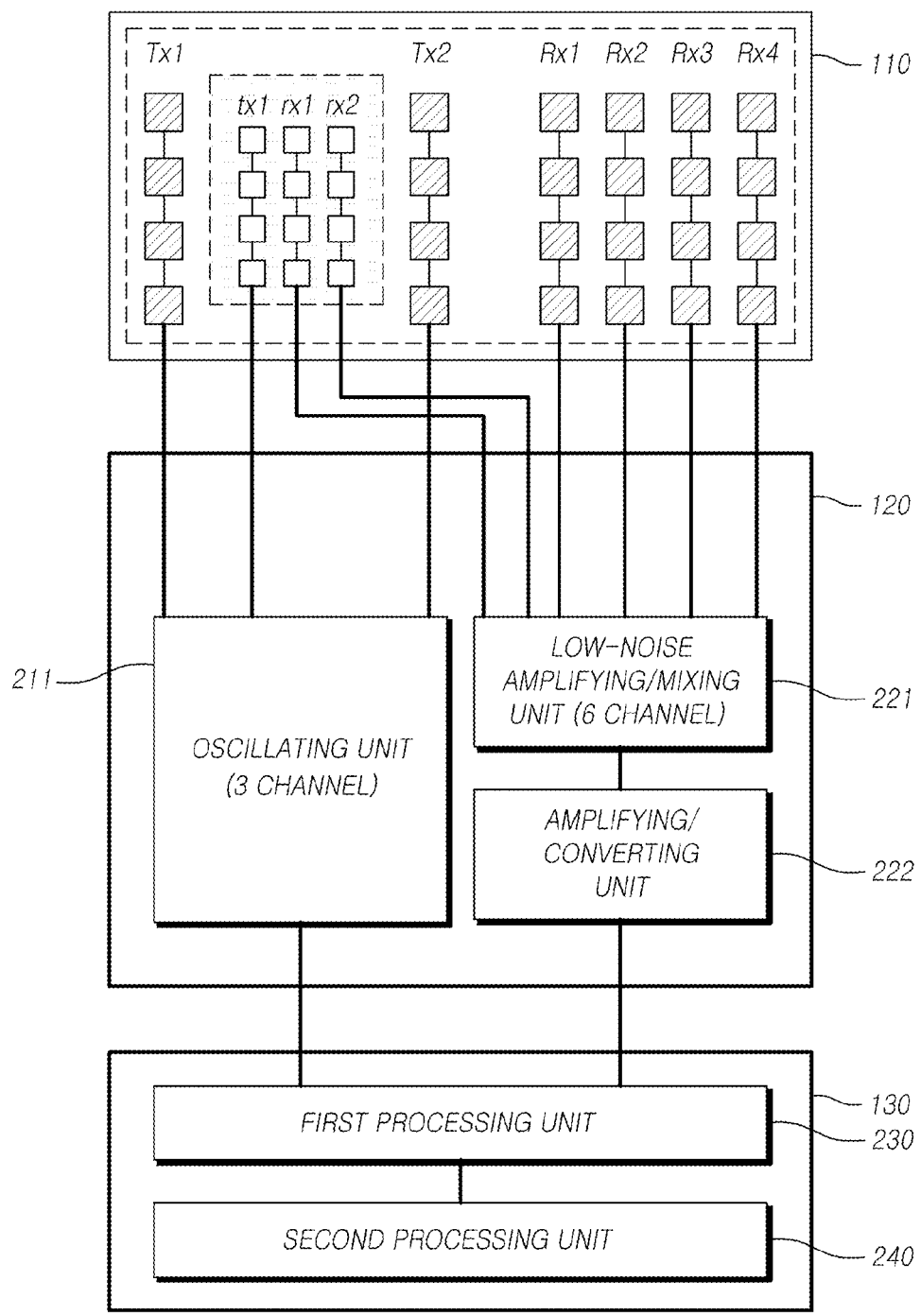
FIG. 6 is the other exemplary view illustrating a way of controlling the antenna included in an integrated radar apparatus in accordance with an embodiment of the present invention.

Referring to FIG. 6, the transmitting unit 210 and the receiving unit 220 included in the transceiver unit 120 control the antennas in connection with the transmission and the reception according to the way of controlling the antenna, such as the way of multi-channel. In this case, the integrated radar apparatus 100 may be embodied as in FIG. 6 without the transmitting terminal switch 510 at the transmitting unit 210 and the receiving terminal switch 520 at the receiving unit 220 included in the transceiver unit 120.

Here, because the transmitting unit 210 receives the long and mid-range signal and the short range signal through the channels, each of which is individually assigned to the plurality of long and mid-range transmitting antennas (Tx1, Tx2) and the one or more short range transmitting antennas (tx1), the oscillating unit 211 in the transmitting unit 210 should generate the long and mid-range signals and the short range signals to be transmitted through the multi-channel including the channels, each of which is individually assigned to the plurality of the long and mid-range transmitting antennas (Tx1, Tx2) and the one or more short range transmitting antennas (tx1). Accordingly, in the embodiment illustrated in FIG. 6, the oscillating unit 211 needs three channels, which corresponds to the number of the transmitting antennas (Tx1, Tx2, tx1).

Also, because the receiving unit 220 receives the long and mid-range echo signal and the short range echo signal through the channels, each of which is individually assigned to the plurality of long and mid-range receiving antennas (Rx1, Rx2, Rx3, Rx4) and the one or more short range receiving antennas (rx1, rx2), the low-noise amplifying/mixing unit 221 in the receiving unit 220 should perform the functions of low-noise amplifying and mixing for the long and mid-range echo signals or the short range echo signals received through the channels, each of which is individually assigned to the plurality of long and mid-range receiving antennas (Rx1, Rx2, Rx3, Rx4) and the one or more short range receiving antennas (rx1, rx2). Accordingly, the low-noise amplifying/mixing unit 221 needs 6 channels corresponding to the number of the receiving antennas (Rx1, Rx2, Rx3, Rx4, rx1, rx2) in the embodiment of FIG. 6.

Figure 7:
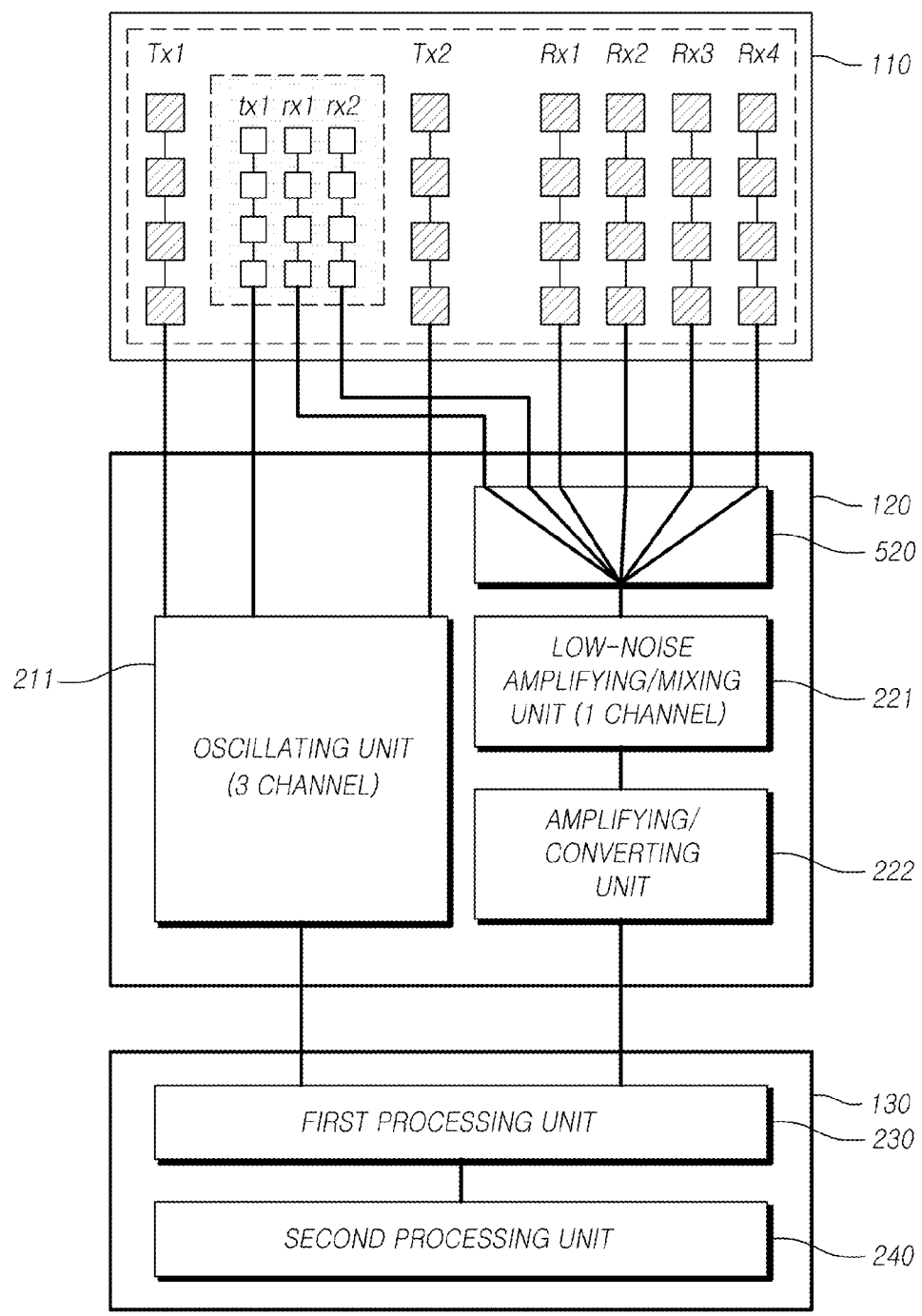
FIG. 7 is another exemplary view illustrating a way of controlling the antenna included in an integrated radar apparatus in accordance with an embodiment of the present invention.

Referring to FIG. 7, the transmitting unit 210 included in the transceiver unit 120 controls the plurality of long and mid-range transmitting antennas (Tx1, Tx2) and the one or more short range transmitting antenna (tx1) according to the way of controlling the antenna, such as the way of multi-channel, and the receiving unit 220 included in the transceiver unit 120 controls the plurality of long and mid-range receiving antennas (Rx1, Rx2, Rx3, Rx4) and the one or more short range receiving antennas (rx1, rx2) according to the way of controlling the antenna, such as the way of switching. In this case, the integrated radar apparatus 100 may be embodied as in FIG. 7 by including the receiving terminal switch 520 at the receiving unit 220 in the transceiver unit 120.

Here, because the transmitting unit 210 transmits the long and mid-range signal and the short range signal through the channels, each of which is individually assigned to the plurality of long and mid-range transmitting antennas (Tx1, Tx2) and the one or more short range transmitting antennas (tx1), the oscillating unit 211 in the transmitting unit 210 should generate the long and mid-range signal and the short range signal to be transmitted through the multi-channel including the channels, each of which is individually assigned to the plurality of the long and mid-range transmitting antennas (Tx1, Tx2) and the one or more short range transmitting antennas (tx1). Accordingly, in the embodiment illustrated in FIG. 7, the oscillating unit 211 needs 3 channels, which corresponds to the number of the transmitting antennas (Tx1, Tx2, tx1).

On the other hand, because the receiving unit 220 switches to an antenna selected from the plurality of long and mid-range receiving antennas (Rx1, Rx2, Rx3, Rx4) and the one or more short range receiving antennas (rx1, rx2) through the receiving terminal switch 520, and then receives the long and mid-range echo signals or the short range echo signals through the selected one of the receiving antennas (Rx1, Rx2, Rx3, Rx4, rx1, rx2), the low-noise amplifying/mixing unit 221 in the receiving unit 220 needs perform the functions of the low-noise amplifying and the mixing only for the long and mid-range echo signals or the short range echo signals, which are received through the selected one of the receiving antennas (Rx1, Rx2, Rx3, Rx4, rx1, rx2). Accordingly, the low-noise amplifying/mixing unit 221 needs only a single channel in the embodiment illustrated in FIG. 7.

Figure 8:
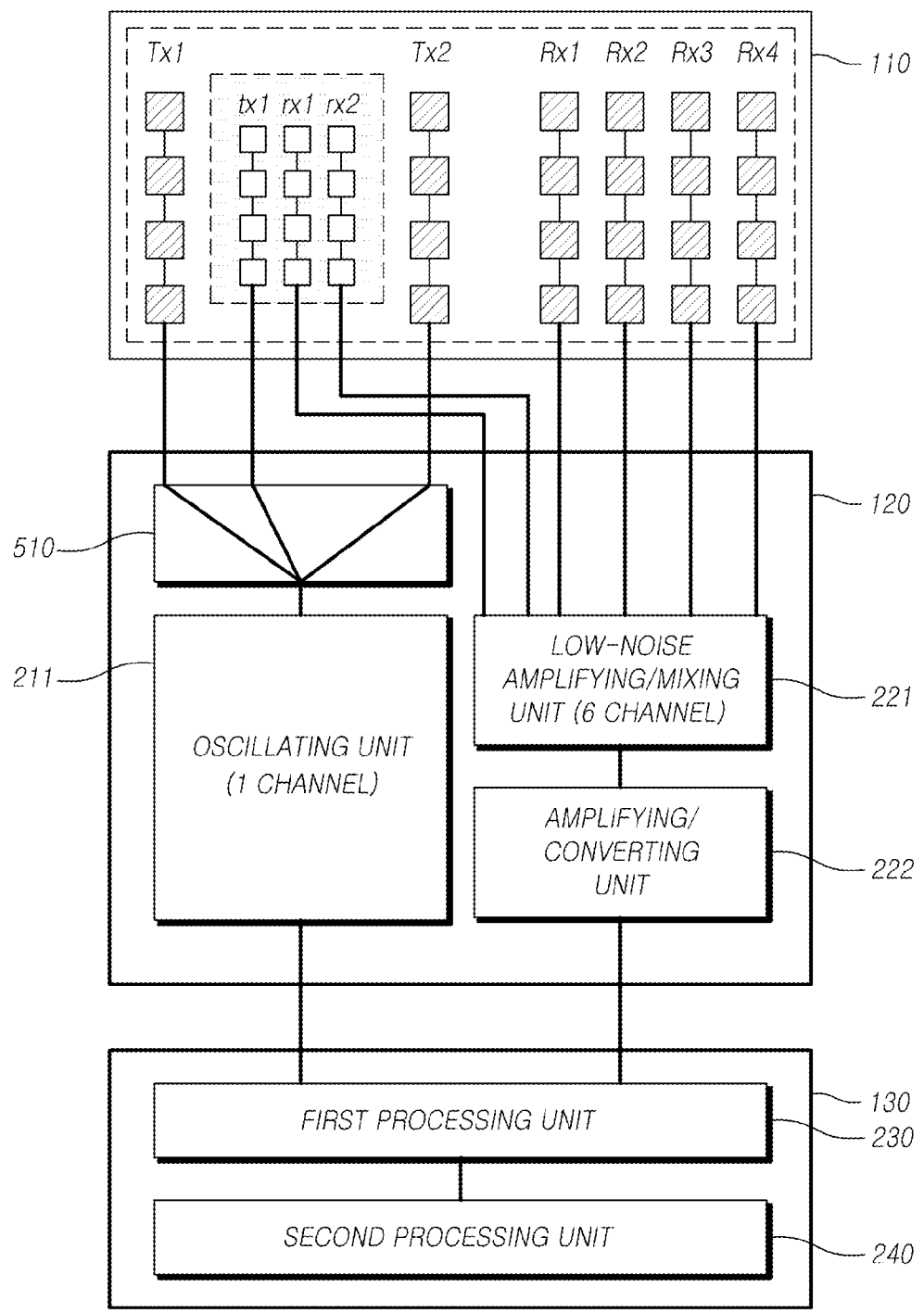
FIG. 8 is yet another exemplary view illustrating a way of controlling the antenna included in an integrated radar apparatus in accordance with an embodiment of the present invention.

Referring to FIG. 8, the transmitting unit 210 in the transceiver unit 120 controls the plurality of long and mid-range transmitting antennas (Tx1, Tx2) and the one or more short range transmitting antennas (tx1) according to the way of controlling the antenna, such as the way of switching, and the receiving unit 220 in the transceiver unit 120 controls the plurality of long and mid-range receiving antennas (Rx1, Rx2, Rx3, Rx4) and the one or more short range receiving antennas (rx1) according to the way of controlling the antenna, such as the way of multi-channel. In this case, the integrated antenna apparatus 100 includes the transmitting terminal switch 510 at the transmitting unit 210 in the transceiver unit 120 as in the embodiment illustrated in FIG. 8.

Here, because the transmitting unit 210 included in the transceiver 120 switches to an antenna selected from the plurality of long and mid-range transmitting antennas (Tx1, Tx2) and the one or more short range antennas (tx1) through the transmitting terminal switch 510 and then receives the long and mid-range signals or the short range signals through the selected one of the transmitting antennas (Tx1, Tx2, tx1), the oscillating unit 211 in the transmitting unit 210 only needs generate the long and mid-range signals or the short range signals to be transmitted through the selected one of the transmitting antennas (Tx1, Tx2, tx1). Accordingly, the oscillating unit 211 needs only a single channel as illustrated in FIG. 8.

Also, because the receiving unit 220 receives the long and mid-range echo signals and the short range echo signals through the channels, each of which is individually assigned to the plurality of long and mid-range receiving antennas (Rx1, Rx2, Rx3, Rx4) and the one or more short range receiving antennas (rx1, rx2), the low-noise amplifying/mixing unit 221 in the receiving unit 220 should perform the functions of low-noise amplifying and mixing for the long and mid-range echo signals or the short range echo signals received through the channels, each of which is individually assigned to the plurality of long and mid-range receiving antennas (Rx1, Rx2, Rx3, Rx4) and the one or more short range receiving antennas (rx1, rx2). Accordingly, the low-noise amplifying/mixing unit 221 needs 6 channels, which corresponds to the number of the receiving antennas (Rx1, Rx2, Rx3, Rx4, rx1, rx2) as in the embodiment of FIG. 8.

According to the embodiments of the integrated radar apparatus 100 illustrated in FIGS. 5-8, the integration of the long and mid-range radar function and the short range radar function makes it possible to provide the angle resolution with the high definition, to decrease total number of the antennas, and to decrease the number of RF hardware devices accordingly. Also, with the arrangement of the short range transmitting antenna and the short range receiving antenna between the long and mid-range transmitting antennas (Tx1, Tx2), it is possible to embody the small-sized integrated radar apparatus 100 enabling the long and mid-range detection and the short range detection at the same time.

On the other hand, as illustrated in FIGS. 1 and 2, the integrated radar apparatus 100 according to the embodiment of the present invention includes a processor 130 for controlling the generation of the signal to be transmitted and processing the signal using the transmitted and received data, wherein the processor 130 distributes to a first processing unit 230 and a second processing unit 240 the signal processing which requires large amount of calculation.

The first processing unit 230 obtains one or more transmitting data of the long and mid-range data and the short range data, and one or more receiving data of the long and mid-range receiving data and the short range receiving data, which are digital-converted at the amplifying/converting unit 222 in the transceiver unit 120, controls the generation of one or more of the long and mid-range signals and the short range signals on the basis of the obtained transmitting data, synchronizes and frequency-converts the obtained transmitting data. The second processing unit 240 performs CFAR (Constant False Alarm Rate) calculation, Tracking selection calculation and Target calculation on the basis of the transmitting data and the receiving data, which are frequency-converted at the first processing unit 230, and extracts angle information, velocity information and distance information about one or more of the long and mid-range targets and the short range targets.

The second processing unit 240 performs the functions of Failsafe and Diagnostic while communicating with one or more of an engine, peripheral sensors, a peripheral ECU (Electronic Control Unit) and vehicle control systems (for instance, ESC (Electronic Stability Control)).

The first processing unit 230 may be embodied by means of FPGA (Field Programmable Gate Array) or ASIC (Application Specific Integrated Circuit) and the second processing unit 240 may be embodied by means of MCU (Micro Controller Unit) or DSP (Digital Signal Processor). As such, it is possible to decrease the amount of process calculations and the hardware size.

On the other hand, the transceiver 120 may be embodied by means of a Discrete IC, one-chip or two-chip, using GaAs (Gallium Arsenide), SiGe (silicon germanium) and CMOS (Complementary Metal-Oxide Semiconductor). As such, it is possible to significantly decrease the hardware size As described herein before, the antenna unit 110 included in the integrated radar apparatus 100 according to the embodiment of the present invention includes the long and mid-range antenna unit 111 including the plurality of long and mid-range transmitting antennas and the plurality of long and mid-range receiving antennas, and the short range antenna unit 112 including the one or more short range transmitting antennas and the one or more short range receiving antennas.

It is possible to design the antenna unit 110 to have the arrangement in that a distance between the plurality of long and mid-range transmitting antennas included in the long and mid-range antenna unit 111 of the antenna unit 110 is proportional to the product of a distance between the plurality of long and mid-range receiving antennas by the number of the plurality of long and mid-range receiving antennas.

Also, it is possible to arrange antennas in such a manner that the short range antenna unit 112 in the antenna unit 110 is contained in the long and mid-range antenna unit 111. For instance, the one or more short range transmitting antennas and the one or more short range receiving antennas included in the short range antenna unit 112 may be arranged between the plurality of long and mid-range transmitting antennas included in the long and mid-range antenna unit 111.

Figure 3:
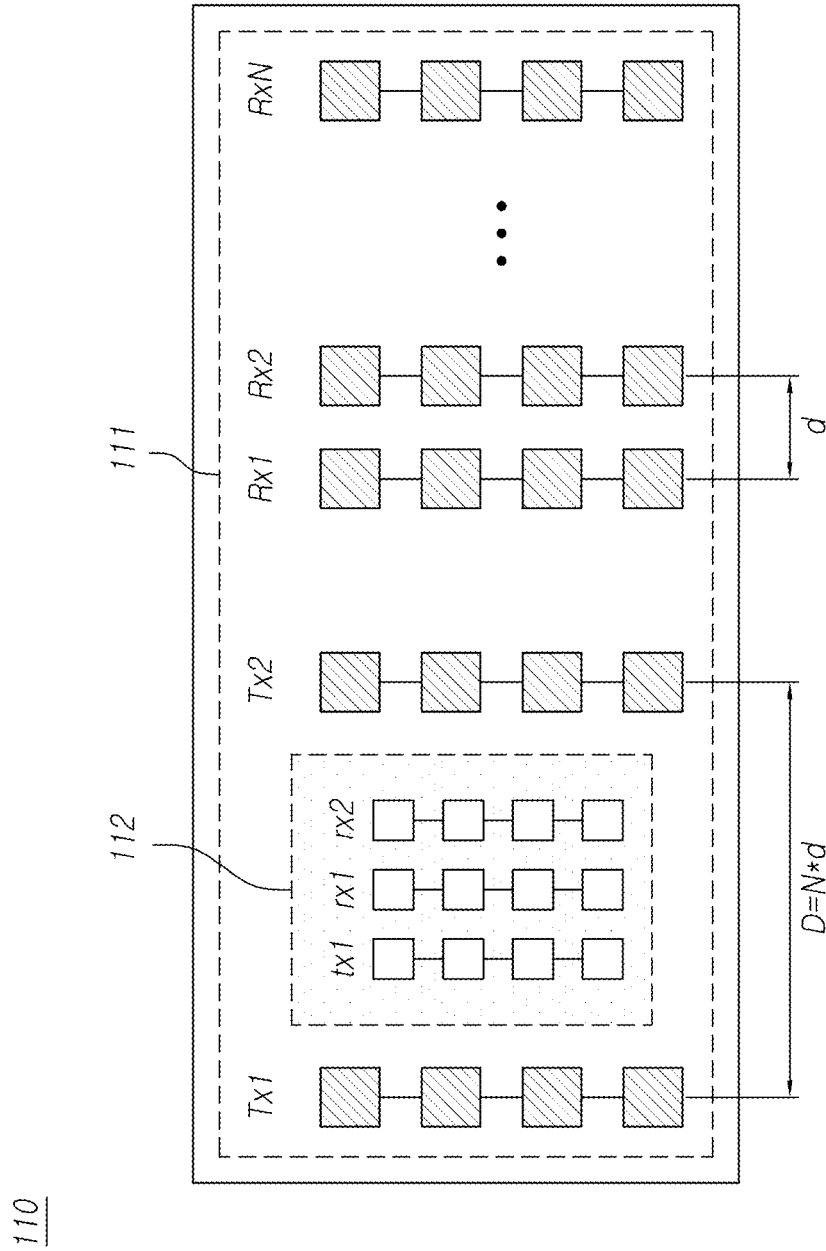
FIG. 3 is an exemplary view of an antenna unit included in an integrated radar apparatus in accordance with an embodiment of the present invention.

The antenna unit 110 may be designed to have the antenna arrangement illustrated in FIG. 3. However, in the exemplary antenna arrangement in FIG. 3, it is assumed that the long and mid-range antenna unit 111 includes the two long and mid-range transmitting antennas (Tx1, Tx2) and the N long and mid-range receiving antennas (Rx1, Rx2 ... RxN), and that the short range antenna 112 includes the one short range transmitting antenna (tx1) and the two short range receiving antennas (rx1, rx2).

With reference to the arrangement of the antennas in FIG. 3, it is possible to arrange the antennas in such a manner that D is proportional to N*d, wherein the "D" is a distance between the two long and mid-range transmitting antennas (Tx1, Tx2) included in the long and mid-range antenna unit 111 of the antenna unit 110; the "d" is a distance between the long and mid-range receiving antennas, the number of which is "N"; and the "N" is the number of the long and mid-range receiving antennas.

Also, the short range antenna unit 112 of the antenna unit 110 is arranged to be contained within the long and mid-range antenna unit 111. Referring to the antenna arrangement in FIG. 3, the one or more short range transmitting antennas (tx1) and the two short range receiving antennas (rx1, rx2) included in the short range antenna unit 112 are arranged between the two long and mid-range transmitting antennas (Tx1, Tx2) included in the long and mid-range antenna unit 111.

On the other hand, the product of the number of the plurality of long and mid-range transmitting antennas by the number of the plurality of the long and mid-range receiving antennas included in the antenna unit 110 is designed to be inversely proportional to the angle resolution required by the integrated radar apparatus 100 according to the embodiment of the present invention. For instance, the angle resolution required by the integrated radar apparatus 100 may be represented as shown in Equation 1, wherein the "M" is the number of the long and mid-range transmitting antennas; the "N" is the number of the long and mid-range receiving antennas; and the "d" is a distance between the long and mid-range receiving antennas.

$$\text{Angle resolution} \propto 1/(M \times N \times d) \quad \text{[Equation 1]}$$

According to Formula 1, if it is desired to improve the angle resolution with the high definition, the number (N) of the long and mid-range receiving antennas should be increased to thereby make FOV (Field of View) narrow, so that the angle resolution may be improved thereby.

In consideration of the above, the angle resolution of the integrated radar apparatus 100 having the antenna arrangement according to the present invention wherein the number of the long and mid-range transmitting antennas is M and the number of the long and mid-range receiving antennas is N, is equal to that of the conventional radar apparatus wherein the number of the long and mid-range transmitting antennas is one and the number of the long and mid-range receiving antennas is M*N.

The angle resolution will be detailed herein below with reference to FIGS. 9a, 9b and 9c, which illustrate the effects of the integrated radar apparatus of the present invention enabling the angle resolution with the high definition and the decrease in the hardware size and the manufacturing cost. It is assumed that the long and mid-range transmitting channels and the long and mid-range receiving channels are assigned to the long and mid-range transmitting antennas and the long and mid-range receiving antennas, respectively. In other words, it is assumed that the number of the long and mid-range transmitting antennas is equal to the number of the long and mid-range transmitting channels and that the number of the long and mid-range receiving antennas is equal to the number of the long and mid-range receiving channels.

Figure 9:
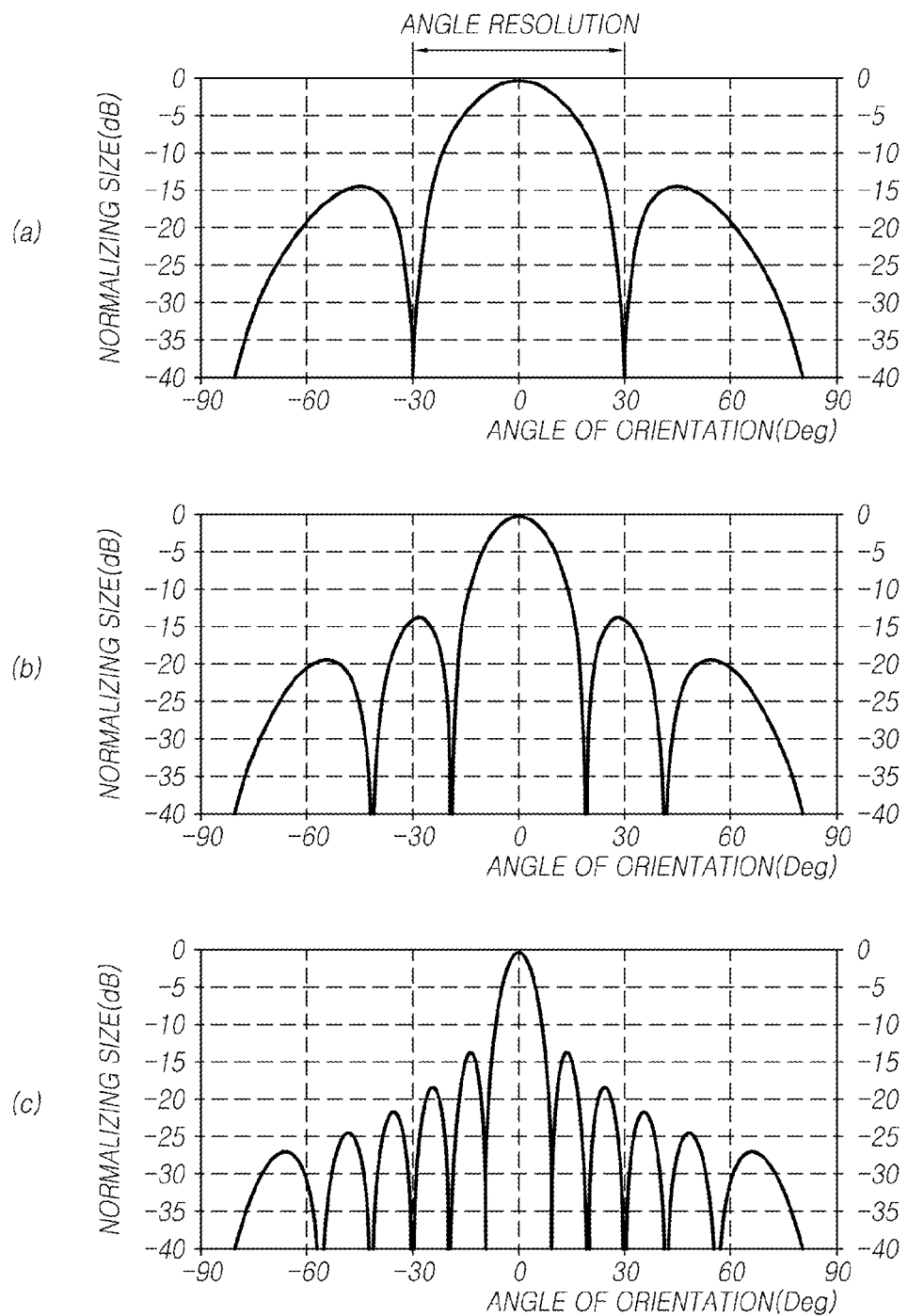
FIG. 9 is an explanatory view illustrating the advantages in that an integrated radar apparatus in accordance with an embodiment of the present invention attains angle resolution with high definition and minimizes size and manufacturing cost.

FIG. 9a is the beam pattern illustrating that the angle resolutions of the integrated radar apparatus 100 of the present invention is equal to that of the conventional radar apparatus, wherein the integrated radar apparatus 100 includes the two long and mid-range transmitting antennas and two long and mid-range receiving antennas, and wherein the conventional radar apparatus includes the one long and mid-range transmitting antenna and the four long and mid-range receiving antennas. However, the total number of the antennas and the channels is four (=2+2) in the present invention, whereas the total number of the antennas and the channels is five (=1+4) in the conventional apparatus. In other words, the integrated radar apparatus 100 according to the embodiment of the present invention only needs the decreased number of the antennas and the channels only, compared to the conventional radar apparatus. Accordingly, it is possible to decrease the number of antennas and the number of devices included in the transceiver unit 120 and the processor 130, and thus to decrease the hardware size and the manufacturing cost.

FIG. 9b is the beam pattern illustrating that the angle resolutions of the integrated radar apparatus 100 of the present invention is equal to that of the conventional radar apparatus, wherein the integrated radar apparatus 100 includes the two long and mid-range transmitting antennas and three long and mid-range receiving antennas, and wherein the conventional radar apparatus includes the one long and mid-range transmitting antenna and the six long and mid-range receiving antennas. However, the total number of the antennas and the channels is five (=2+3) in the present invention, whereas the total number of the antennas and the channels is seven (=1+6) in the conventional apparatus. In other words, like the case illustrated in FIG. 9a, the integrated radar apparatus 100 according to the embodiment of the present invention only needs the decreased number of the antennas and the channels, compared to the conventional radar apparatus. Accordingly, it is possible to decrease the number of antennas and the number of devices included in the transceiver unit 120 and the processor 130, and thus to decrease the hard-ware size and the manufacturing cost.

FIG. 9c is the beam pattern illustrating that the angle resolutions of the integrated radar apparatus 100 of the present invention is equal to that of the conventional radar apparatus, wherein the integrated radar apparatus 100 includes two long and mid-range transmitting antennas and six long and mid-range receiving antennas, and wherein the conventional radar apparatus includes the one long and mid-range transmitting antenna and twelve long and mid-range receiving antennas. However, the total number of the antennas and the channels is eight (=2+6) in the present invention, whereas the total number of the antennas and the channels is thirteen (=1+12) in the conventional apparatus. In other words, like the case illustrated in FIGS. 9a and 9b, the integrated radar apparatus 100 according to the embodiment of the present invention only needs the decreased number of the antennas and the channels, compared to the conventional radar apparatus. Accordingly, it is possible to decrease the number of antennas and the number of devices included in the transceiver unit 120 and the processor 130, and thus to decrease the hardware size and the manufacturing cost.

As described before, the integrated radar apparatus 100 according to the embodiment of the present invention makes it possible to decrease the number of the antennas and the channels depending on the antenna structure and the way of controlling the antenna, to decrease the number of devices included in the transceiver unit 120 and the processor 130, and to decrease the hardware size and the manufacturing cost, while having the same angle resolution as that of the conventional apparatus.

Figure 10:
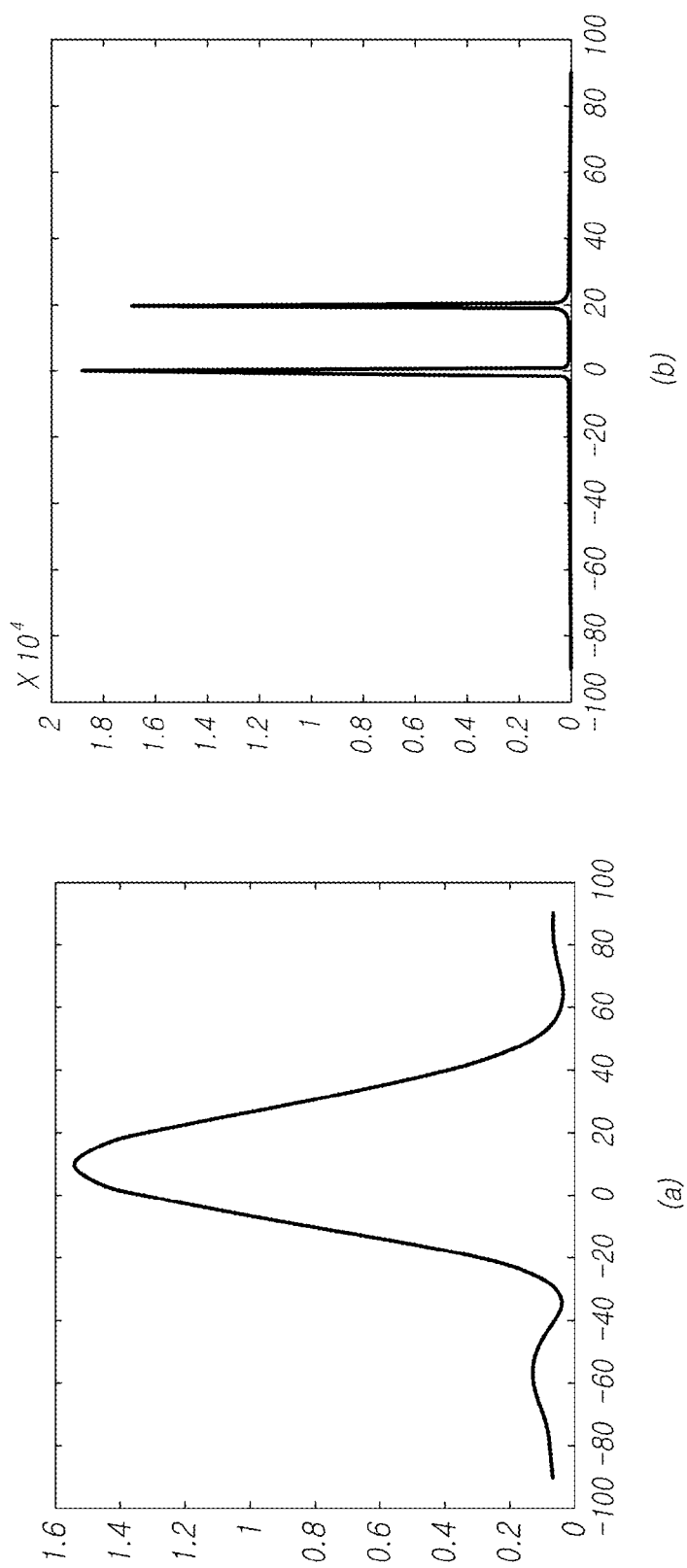
FIG. 10 is an explanatory view, wherein an angle resolution controller included in an integrated radar apparatus in accordance with an embodiment of the present invention improves angle resolution by applying angle estimation algorithm.

On the other hand, the integrated radar apparatus 100 according to the embodiment of the present invention adopts the angle estimation algorithm, such as LMS, RLS, MUSIC and ESPRIT to thereby improve the physical angle resolution of the antenna. Referring to FIG. 10*a*, when the long and mid-range target (or the short range target) is located in directions of 10° and 20° in case of the conventional apparatus, it is impossible to discern a long and mid-range target (or the short range target) due to the limitation in physical angle resolution of the antenna. When the angle estimation algorithm is adopted, however, the physical limitation is overcome, and thus it is possible to improve the angle resolution as illustrated in FIG. 10*b* and thus to discern the long and mid-range target (and the short range target). Accordingly, the integrated radar apparatus 100 according to the embodiment of the present invention may further include an angle resolution controller for controlling the angle resolution in order to make it possible to discern one or more of the long and mid-range targets and the short range targets located at a certain angle by means of the angle estimation algorithm.

The integrated radar apparatus 100 according to the embodiment of the present invention may be linked to a vehicle system using the long range radar signal, a vehicle system using the mid-range radar signal, and a vehicle system using the short range radar signal.

Figure 4:
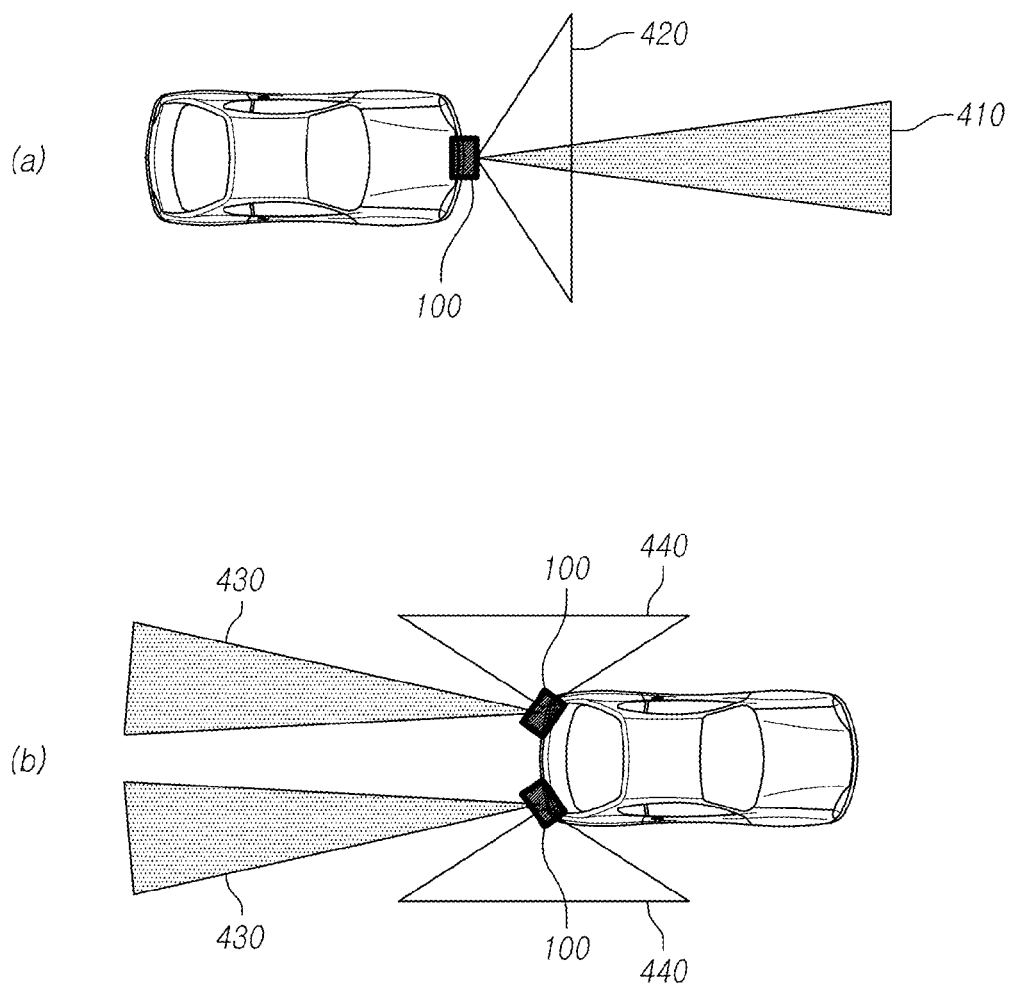
FIG. 4 is an explanatory view illustrating a vehicle system, wherein an integrated radar apparatus in accordance with an embodiment of the present invention is applied thereto.

As illustrated in FIGS. 4*a* and 4*b*, the integrated radar apparatus 100 is mounted to a front edge or a side-rear edge of a vehicle to be linked to the vehicle system, such as ACC (Adaptive Cruise Control) system for detecting a driver's own lane in a range between 0 and 250 m using the long range signal 410 corresponding to the long range radar signal; LCA (Lane-Change Assist) system for detecting a rear-side lane in a range between 0 and 70 m using the mid range signal 420 corresponding to the mid range radar signal; Stop & Go system for performing front detection and anti-crash using the short range signal 420 corresponding to the short range radar signal; Parking Assist system for performing parking control using the short range signals 420, 440 corresponding to the short range radar signal; and LCA (Lane-Change Assist)/BSD (Blind-Spot Detection)/RPC (Rear Pre Crash) system for detecting a rear-side and a vehicle cutting in from a side lane to thereby perform the functions of crash warning and anti-crash.

Figure 11:
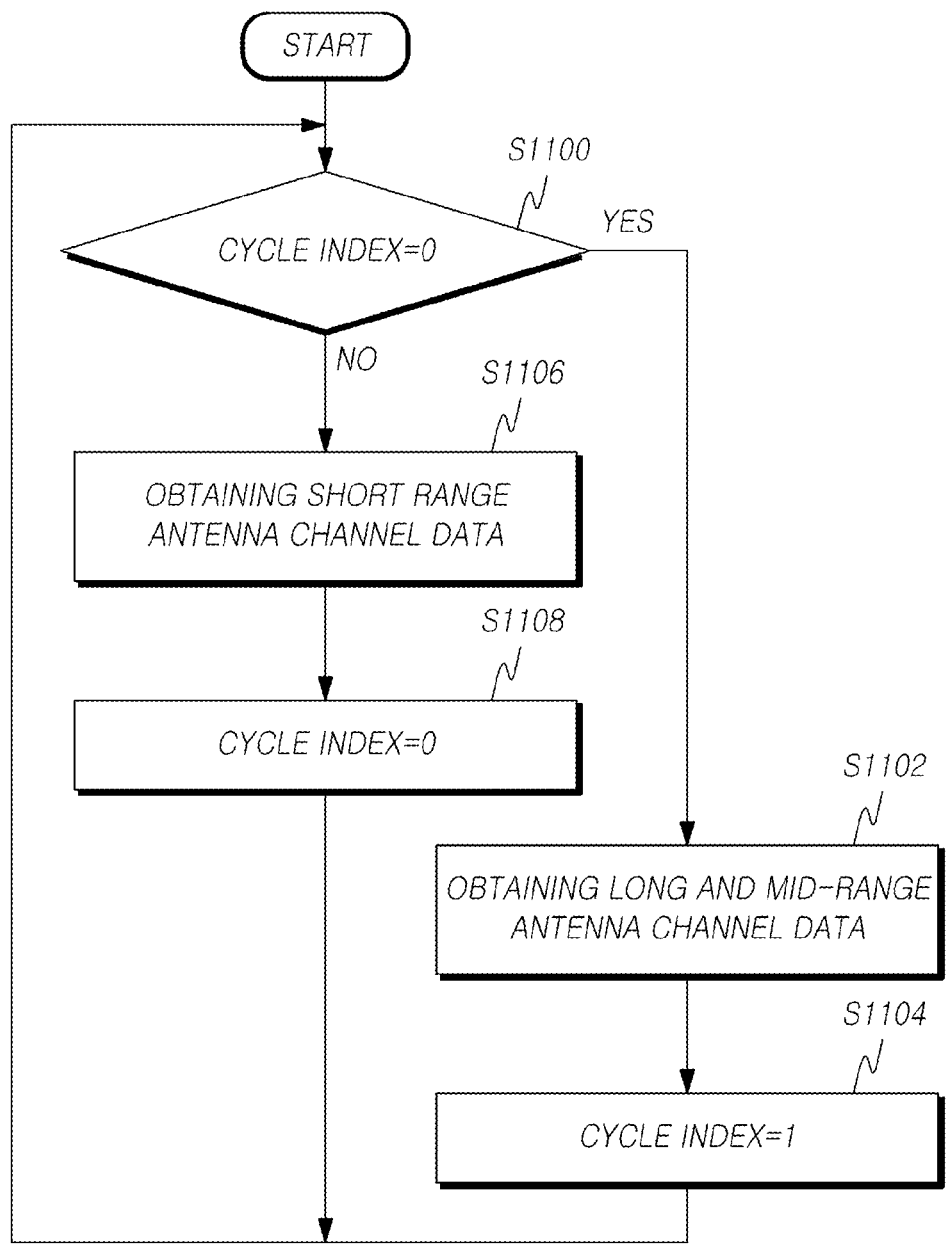
FIG. 11 is a flow chart illustrating a way of obtaining data which is provided by an integrated radar apparatus in accordance with an embodiment of the present invention.

FIG. 11 is a flow chart illustrating the method of obtaining data provided by the integrated radar apparatus 100 according to the embodiment of the present invention.

Referring to FIG. 11, the integrated radar apparatus 100 according to the embodiment of the present invention uses a Cycle Index, which is a control parameter for obtaining data, to thereby control the long and mid-range antenna 111 and the short range antenna 112, so that it performs obtaining the short range echo signal by transmitting the short range signal, and obtaining the long and mid-range echo signal by transmitting the long and mid-range signal.

Referring to FIG. 11, it is determined whether or not Cycle Index is equal to 0 (zero) (S1100). If Cycle Index is equal to 0, data obtaining is performed through the long and mid-range antenna channel (S1102) (Here, the data means the long and mid-range echo signals, which are generated by reflecting the transmitted long and mid-range signals on the long and mid-range targets). When the long and mid-range antenna unit 111 receives all the long and mid-range echo signals through the individual channels with the time delay therebetween, Cycle Index is changed from "0" to "1" (S1104). If Cycle Index is changed to "1", data obtaining is performed through the short range antenna channel (S1106) after it is determined whether Cycle Index is equal to "O" (S1100) (Here, the data means the short range echo signals, which are generated by reflecting the transmitted short range signals on the short range targets). As such, when the short range antenna unit 112 receives all the short range echo signals through the individual channels with time delay there-between, Cycle Index is changed from "1" to "0" (S1108) and then the above-described process is repeated for obtaining next data.

Figure 12:
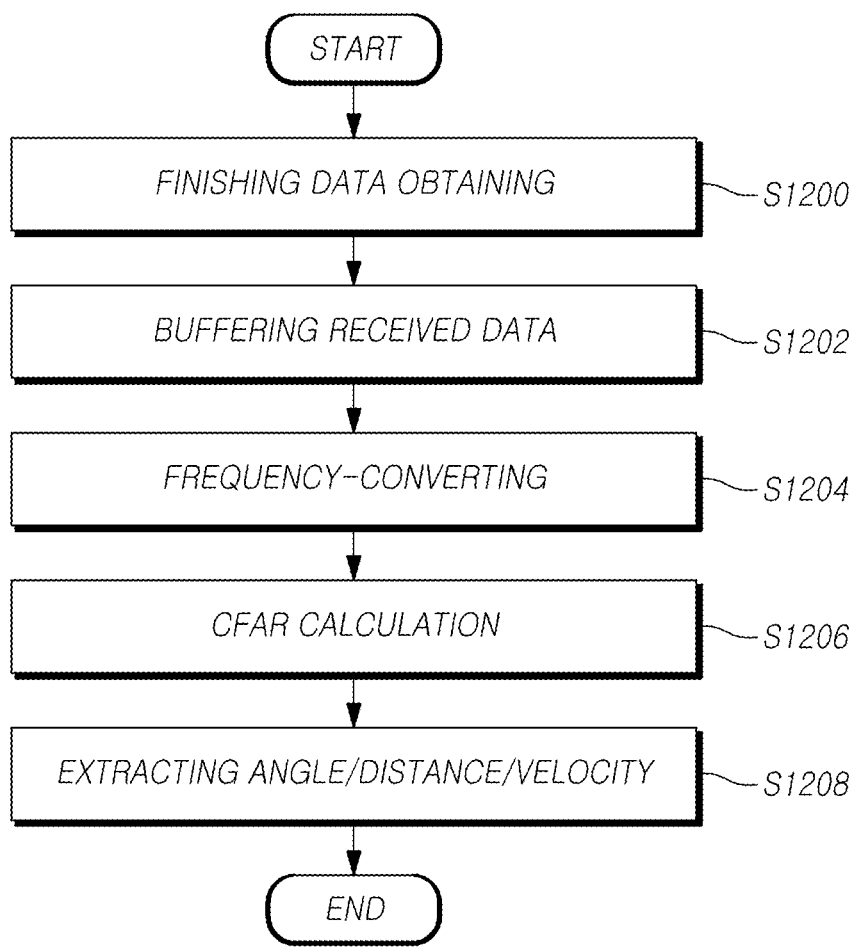
FIG. 12 is a flow chart illustrating a way of processing signal which is provided by an integrated radar apparatus in accordance with an embodiment of the present invention.

FIG. 12 is the flow chart illustrating the method of processing a signal provided by the integrated radar apparatus 100 according to the embodiment of the present invention.

Referring to FIG. 12, the method of processing a signal provided by the integrated radar apparatus 100 according to the embodiment of the present invention includes: finishing data-obtaining (S1200) according to the method illustrated in FIG. 11; performing data-buffering for the obtained data (the received data) (S1201); frequency-converting for the buffered data (S1204); performing CFAR (Constant False Alarm Rate) calculation on the basis of the frequency-converted data (S1206); and extracting angle information, velocity information and distance information about targets (S1208). The frequency converting (S1206) may be performed using Fourier transform, such as Fast Fourier transform (FFT).

The integrated antenna apparatus according to the other embodiment of the present invention includes a plurality of long and mid-range transmitting antennas, a plurality of long and mid-range receiving antennas, one or more short range transmitting antennas and one or more short range receiving antennas, wherein a distance between the plurality of long and mid-range transmitting antennas is proportional to the product of a distance between the plurality of long and mid-range receiving antennas by the number of the plurality of long and mid-range receiving antennas.

The integrated antenna apparatus according to the other embodiment of the present invention includes a plurality of long and mid-range transmitting antennas, a plurality of long and mid-range receiving antennas, one or more short range transmitting antennas and one or more short range receiving antennas, wherein the one or more short range transmitting antennas and the one or more short range receiving antennas are arranged between the plurality of long and mid-range transmitting antennas.

As described above, the embodiment of the present invention provides the antenna structure which makes it possible to attain the angle resolution with the high definition, to decrease the size and the number of devices, and to integrate the long and mid-range radar function and the short range radar function. Also, the embodiment of the present invention provides the integrated radar apparatus 100 which makes it possible to efficiently process the transmission and the reception of signals for the long and mid-range radar function and the short range radar function using the antenna described above.

Moreover, the embodiment of the present invention provides the integrated antenna apparatus with the antenna structure which makes it possible to attain the angle resolution with the high resolution, to decrease the size and the number of devices, and to integrate the long and mid-range radar function and the short range radar function.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hard-wares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An integrated radar apparatus comprising:
   an antenna unit having a long and mid-range antenna unit and a short range antenna unit, wherein the long and mid-range antenna unit includes a plurality of long and mid-range transmitting antennas and a plurality of long and mid-range receiving antennas and the short range antenna unit includes one or more short range transmitting antennas and one or more short range receiving antennas; and
   a transceiver unit configured to control the long and mid-range antenna unit and the short range antenna unit according to a switching mode, transmit one or more of the long and mid-range signals and the short range signals, and receive one or more of the long and mid-range echo signals generated by reflecting the long and mid-range signals on long and mid-range targets and short range echo signals generated by reflecting the short range signals on short range targets,
   wherein the transceiver unit includes a transmitting terminal switch and a receiving terminal switch,
   the transmitting terminal switch switches to an antenna selected from the plurality of long and mid-range transmitting antennas and the one or more short range transmitting antennas, and
   the receiving terminal switch switches to an antenna selected from the plurality of long and mid-range receiving antennas and the one or more short range receiving antennas.

2. An integrated radar apparatus as claimed in claim 1, wherein the transceiver unit transmits the long and mid-range signals or the short range signals through the selected long and mid-range transmitting antenna or the selected short range transmitting antenna.

3. An integrated radar apparatus as claimed in claim 1, wherein the transceiver unit receives the long and mid-range echo signals or the short range echo signals through the selected long and mid-range receiving antenna or the selected short range receiving antenna.

4. An integrated radar apparatus as claimed in claim 1, wherein the transceiver unit comprises:
   a transmitting unit having an oscillating unit for generating one or more of the long and mid-range signals and the short range signals; and
   a receiving unit having a low-noise amplifying/mixing unit for low-noise amplifying one or more of the long and mid-range echo signals and the short range echo signals and mixing one or more of the long and mid-range echo signals and the short range echo signals which are low-noise amplified, and a amplifying/converting unit for amplifying one or more of the long and mid-range echo signals and the short range echo signals which are mixed, digital-converting one or more of the long and mid-range echo signals and the short range echo signals which are amplified, and generating one or more of long and mid-range receiving data and short range receiving data.

5. An integrated radar apparatus as claimed in claim 4, wherein the oscillating unit and the low-noise amplifying/mixing unit included in the transceiver unit use only one channel.

6. An integrated radar apparatus as claimed in claim 4, wherein the apparatus further comprises:
   a first processing unit for obtaining one or more transmitting data of long and mid-range data and short range data and one or more receiving data of the digital-converted long and mid-range receiving data and the digital-converted short range receiving data which are digital-converted at the amplifying/converting unit, controlling generation of one or more of the long and mid-range signals and the short range signals on the basis of the obtained transmitting data, synchronizing and frequency-converting the obtained transmitting data and the obtained receiving data; and
   a second processing unit for performing CFAR (Constant False Alarm Rate) calculation, a tracking calculation and target selection calculation on the basis of the frequency-converted transmitting data and the frequency-converted receiving data, and extracting angle information, velocity information and distance information about one or more of the long and mid-range targets and the short range targets.

7. An integrated radar apparatus as claimed in claim 6, wherein the second processing unit performs a failsafe function and a diagnostic function while communicating with one or more of an engine, a peripheral sensor, a peripheral electronic control unit and a vehicle control system.

8. An integrated radar apparatus as claimed in claim 6, wherein the first processing unit is embodied by means of FPGA (Field Programmable Gate Array) or ASIC (Application Specific Integrated Circuit), and the second processing unit is embodied by means of MCU (Micro Controller Unit) or DSP (Digital Signal Processor).

9. An integrated radar apparatus as claimed in claim 1, wherein the transceiver unit is embodied by means of Discrete IC, One-chip or Two-chip, using one of GaAs (Gallium Arsenide), SiGe (Silicon Germanium) and CMOS (Complementary Metal-Oxide Semiconductor).

10. An integrated radar apparatus as claimed in claim 1, wherein a distance between the plurality of long and mid-range transmitting antennas is equal to the product of a distance between the plurality of long and mid-range receiving antennas and the number of the plurality of long and mid-range receiving antennas.

11. An integrated radar apparatus as claimed in claim 1, wherein the short range antenna unit is included in the long and mid-range antenna unit.

12. An integrated radar apparatus as claimed in claim 11, wherein the one or more of the short range transmitting antennas and the one or more of the short range receiving antennas included in the short range antenna unit are arranged between the plurality of long and mid-range transmitting antennas included in the long and mid-range antenna unit.

13. An integrated radar apparatus as claimed in claim 1, wherein the product of the number of the plurality of the long and mid-range transmitting antennas and the number of the plurality of the long and mid-range receiving antennas is determined to be inversely proportional to angle resolution required by the integrated radar apparatus.

14. An integrated radar apparatus as claimed in claim 1, wherein the integrated radar apparatus is linked to a vehicle system using a long range radar signal, a vehicle system using a mid-range radar signal, and a vehicle system using a short range radar signal.

* * * * *